United States Patent [19]
Dvorsky et al.

[11] Patent Number: 6,104,171
[45] Date of Patent: Aug. 15, 2000

[54] GENERATOR SET WITH REDUNDANT BUS SENSING AND AUTOMATIC GENERATOR ON-LINE CONTROL

[75] Inventors: Michael A. Dvorsky; Darren L. Krahn, both of Peoria, Ill.

[73] Assignee: Caterpillar Inc., Peoria, Ill.

[21] Appl. No.: 09/197,657

[22] Filed: Nov. 23, 1998

[51] Int. Cl.[7] ............................................. H02J 3/00
[52] U.S. Cl. ........................... 322/8; 322/37; 307/87
[58] Field of Search ........................... 322/7, 8, 20, 37; 290/40 R; 307/87

[56] References Cited

U.S. PATENT DOCUMENTS

| | | |
|---|---|---|
| 3,069,555 | 12/1962 | Kessler . |
| 4,128,771 | 12/1978 | Domenico ................................. 307/52 |
| 4,218,625 | 8/1980 | Beckwith et al. ........................ 307/87 |
| 4,310,771 | 1/1982 | Wyatt et al. ............................... 307/64 |
| 4,349,744 | 9/1982 | Reuther et al. ........................ 290/40 C |
| 4,492,874 | 1/1985 | Near ...................................... 290/40 B |
| 4,536,126 | 8/1985 | Reuther ................................. 290/40 R |
| 4,593,348 | 6/1986 | Tewesmeier ............................... 363/83 |
| 4,714,869 | 12/1987 | Onitsuka .................................. 322/20 |
| 4,766,327 | 8/1988 | Fox .......................................... 307/87 |
| 4,788,647 | 11/1988 | McManus et al. ...................... 364/494 |
| 5,390,068 | 2/1995 | Schultz et al. ............................ 361/95 |
| 5,642,006 | 6/1997 | Cech ........................................ 307/87 |
| 5,701,070 | 12/1997 | Schultz ..................................... 322/37 |

*Primary Examiner*—Nicholas Ponomarenko
*Attorney, Agent, or Firm*—R. Carl Wilbur

[57] ABSTRACT

A generator set controller includes a dead bus sensor producing a dead bus signal indicative of a power failure on a power bus that is an input to the controller on a digital input channel. The controller also receives a voltage signal from a phase of a power bus.

6 Claims, 2 Drawing Sheets

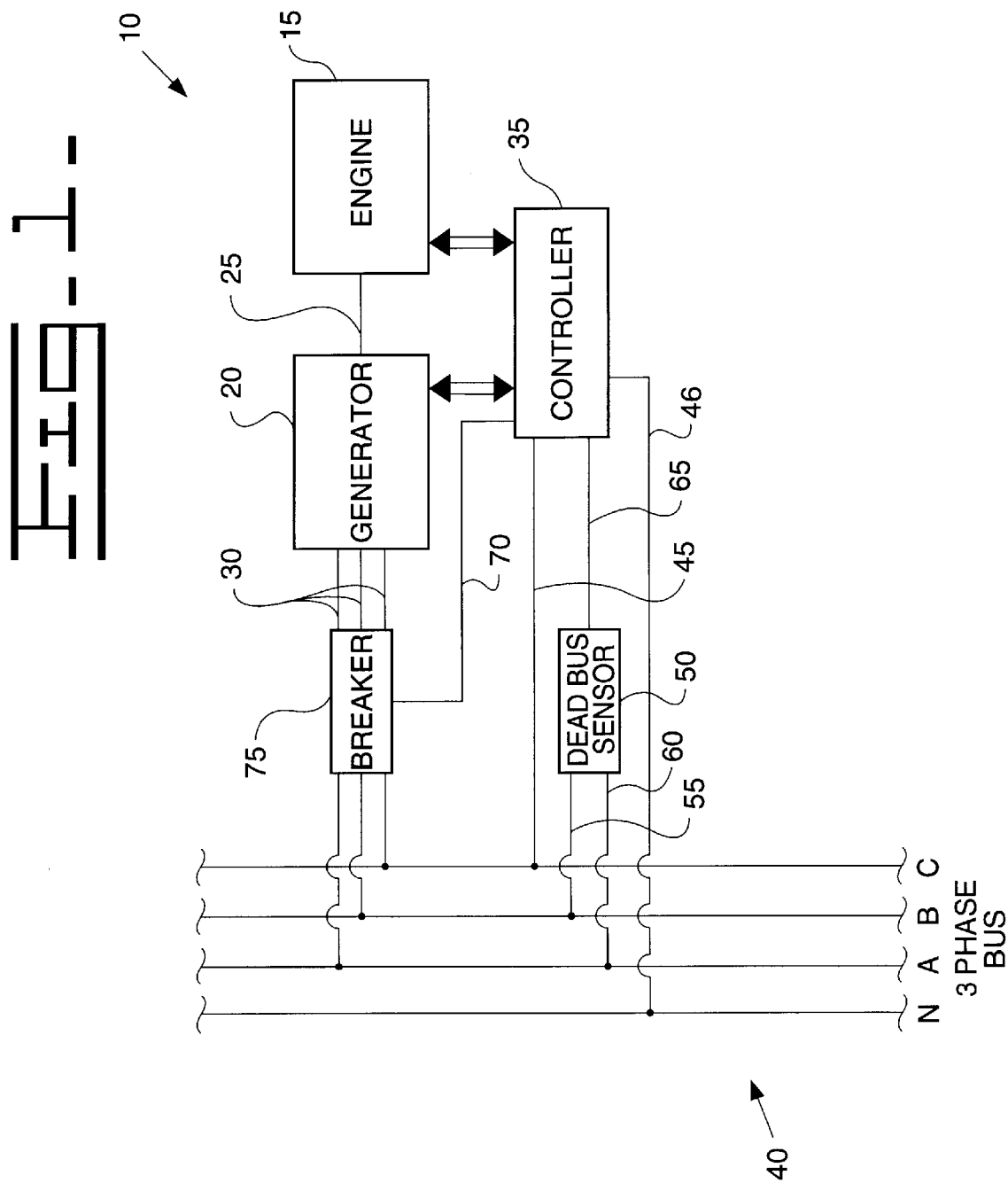

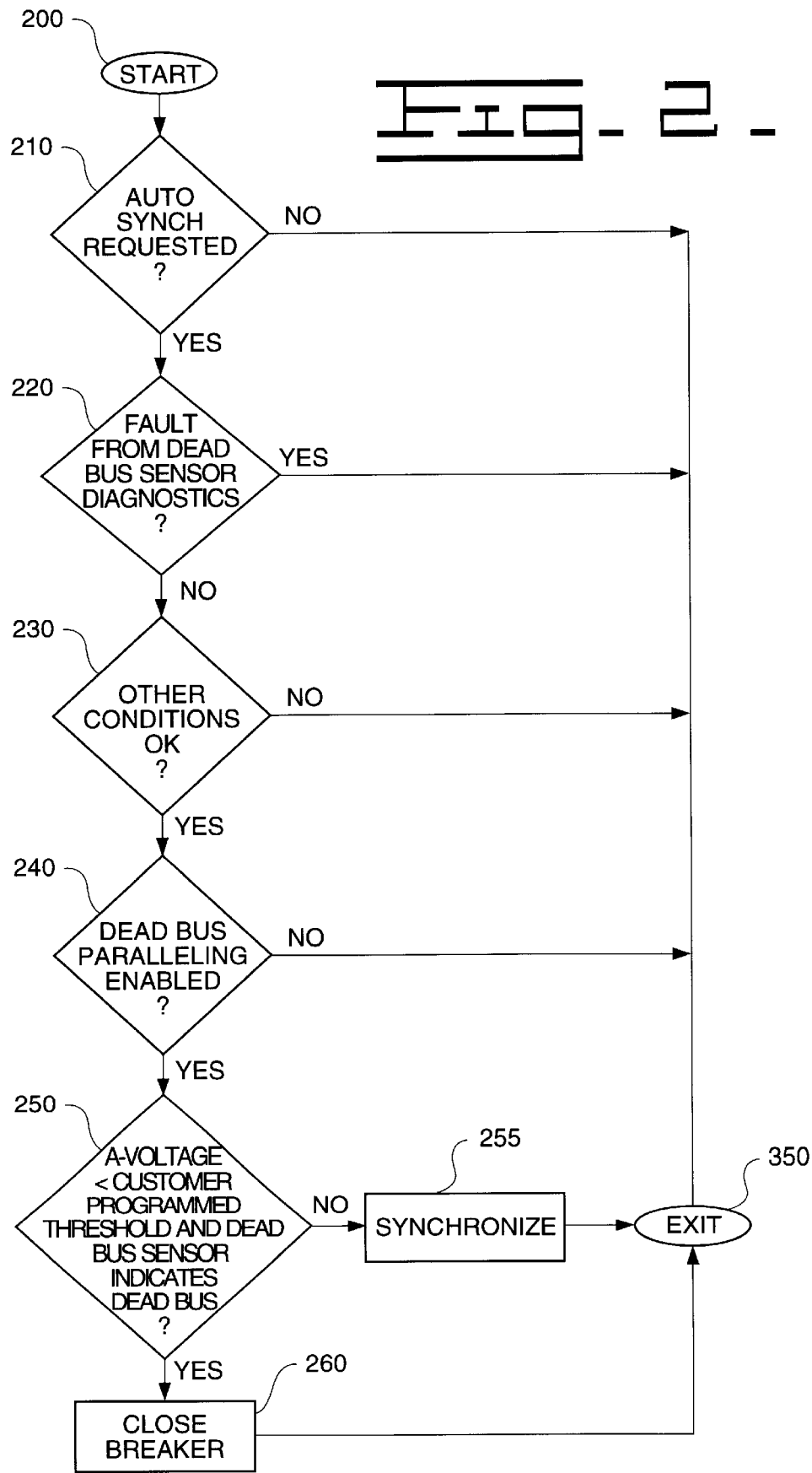

GENERATOR SET WITH REDUNDANT BUS SENSING AND AUTOMATIC GENERATOR ON-LINE CONTROL

TECHNICAL FIELD

The present invention generally relates to a generator set, and more particularly, relates to a generator set with redundant bus sensing and automatic generator on-line control.

BACKGROUND ART

An engine/generator combination is generically referred to as a generator set. One specific application for a generator set is to provide backup power in the event that the main power service for a facility fails. When using such a system, the engine is started and the generator produces power over the power bus when there is an electrical failure. By providing power over the power bus, the facility will continue to have power despite the electrical failure.

In another application, the generator set is used to supplement the power on the power bus during periods of peak demand from the manufacturing plant or facility. Thus, in this application, the generator set will come on line and provide additional power to the power bus during periods of peak load. When connecting to the bus in this case, it is extremely important that the phase of the electrical power from the generator match the phase of the power on the power bus. In order to synchronize the two power supplies, a synchroscope is generally connected between the different phases of the power bus and the different corresponding phases of the generator output, and the synchroscope provides a display of the phase difference between the two power supplies (i.e., between the power bus and the generator output). The operator can then adjust the engine speed to modify the phase of the generator set output in an attempt to match the output phase of the generator with the phase of the power bus. When the two phases are within a predetermined tolerance of one another, the operator can connect the generator set to the power bus. Although the above synchronization process is described in terms of manually adjusting the engine speed and manually connecting the generator set to the power bus, there are known prior art systems that automatically synchronize the generator set output to the power bus and connect the generator set to the bus.

Likewise, these systems are sometimes constructed to be capable of sensing a power failure and automatically starting the generator set and connecting it to the power bus. Sometimes they are constructed to automatically discriminate between a live and a dead bus and to close the breaker without synchronizing when a dead bus is detected, which is often referred to as dead bus sensing.

Although there are prior art systems that automatically synchronize a generator set to the power bus and that are capable to some extent of dead bus sensing and automatically connecting a generator set to a dead bus, there are disadvantages associated with such systems. For example, low cost systems generally monitor only a single voltage input to determine whether the bus is dead. In those cases, a zero volt reading will cause the controller to conclude that the bus is dead and will connect the generator set to the bus. These systems are particularly susceptible to a single point of failure which may include a frayed sensor wire, failed sensor, or other failure causing a zero voltage reading which would then cause the controller to conclude that the bus is dead and connect the generator set to the bus without synchronizing. Connecting a generator set to a live bus in this manner without synchronization can result in damage to the generator set and the electrical system and should be avoided. Thus, it is important to attempt to reduce the chances of connecting the generator set improperly to a live bus.

Some higher cost systems monitor the voltage on all three phases of the power bus. However, these systems typically will require a greater number of analog input/output channels on the controller. Analog input/output channels add cost to the controller and it is preferable to reduce the number of such channels without reducing the functionality of the controller.

It would be preferable to have a system that reduced the likelihood of a single point of failure causing an engine generator set to connect to a live power bus without synchronizing. These and other objects and advantages of the present invention will become apparent to those skilled in the art upon reading the detailed description in connection with the drawings and appended claims.

DISCLOSURE OF THE INVENTION

An embodiment of the present invention includes a generator set controller connected with a three-phase power bus, the controller having at least one analog input connected to a phase of a three phase power bus and a digital input connected to a dead bus sensor. The dead bus sensor is connected to a second and third phase of the bus and produces a live bus signal as a function of electrical characteristics of the second and third phase of the bus. The electronic controller issues a signal to a breaker causing the generator output to be connected with the bus as a function of the signal from the dead bus sensor and the voltage of the power bus phase that is an input on the analog input.

These and other aspects and advantages of the present invention will become apparent to those skilled in the art upon reading the following detailed description in connection with the drawings and appended claims.

BRIEF DESCRIPTION OF THE DRAWINGS

FIG. 1 is a block diagram of a preferred embodiment of a generator set practicing the present invention.

FIG. 2 is a flow chart of a preferred embodiment of the software control implemented in an electronic controller of an embodiment practicing the present invention.

BEST MODE FOR CARRYING OUT THE INVENTION

A preferred embodiment of the best mode of practicing the present invention is described herein. However, the present invention is not limited to this single embodiment. On the contrary, the present invention encompasses all alternative designs and equivalents as may fall within the scope of the appended claims.

Referring first to FIG. 1, subsystems associated with a preferred embodiment of a generator set 10 are shown. The generator set 10 includes an engine 15 connected to a generator 20 through a driveshaft 25, a coupling (not shown), and other well known devices. The generator output 30 typically includes three phases of electrical current offset from one another by 120 degrees. A generator set controller 35 is connected with both the engine 15 and generator 20 to sense, among other things, various operating parameters. For example, the controller 35 may sense engine oil pressure and activate an alarm in the event of low oil pressure. Using a generator set controller 35 in this manner, is well known in the art.

In an embodiment of the present invention, the generator 20 and the controller 35 are connected with a power bus 40. As shown in FIG. 1, a first phase C of the power bus 40 is connected with the controller 35 via connector 45. A neutral wire N is connected with an AC ground input on the controller 35 by connector 40. As will be known to those skilled in the art, this connection may include filtering, signal conditioning, and other circuitry not shown in FIG. 1. A second phase B and a third phase A are connected with a dead bus sensor 50 over connectors 55 and 60. Although a preferred embodiment is described with reference to a four wire bus, the present invention may also be used in connection with a three wire bus (i.e., one that does not include a neutral wire). When used with such a bus, it is necessary for the controller to input a second phase of the bus so that it can measure line to line voltage.

In the four wire bus shown in FIG. 1, the dead bus sensor 50 senses that there is no power on the bus 40 (i.e., the bus is dead). Preferably, the dead bus sensor senses a voltage difference between the second phase B and the third phase A and outputs a live bus signal over connector 65 in response to the voltage potential between the second phase B and the third phase A being greater than a user programmable level. In a preferred embodiment, the dead bus sensor comprises a normally closed relay that opens a contact producing the live bus signal when the voltage difference between the second phase B and the third phase A exceeds a predetermined level. The normally closed relay is preferable because the most common failure is an open signal caused by either a relay failure or a wiring failure. The normally closed relay was selected to prevent the open signal generated by a failure from being misinterpreted as a dead bus. Although a preferred embodiment of the present invention senses a voltage difference between the second and third phases, other phases could readily and easily be used and other forms of sensors could be used. As will be described below with reference to FIG. 2, when the controller 35 receives a request to synchronize to the power bus, initiated either manually by the operator or automatically by other controllers or hardware (not shown), the controller 35 determines whether the power bus 40 is dead (i.e., there has been an electrical failure and the utility is not providing power to the power bus 40). In the event of a dead bus, the controller 35 immediately produces a breaker signal on connector 70 which causes a breaker 75 to connect the generator output 30 to the first C, second B, and third A phase of the power bus 40. In the event that the bus is not dead, the controller 35 initiates a synchronization sequence to synchronize the generator output to the power bus prior to producing the signal on connector 70 to close breaker 75.

Referring now to FIG. 2, a flow chart of software control associated with a preferred embodiment of the invention is shown. Software implementation of the control shown in FIG. 2 can be readily and easily written by those skilled in the art using the instruction set for the particular microprocessor used in controller 35. Such software implementation would be a mechanical step for those skilled in the art.

In block 200, program control begins. Program control then passes from block 200 to block 210. In block 210, the program control determines whether the engine generator set operator has requested an automatic synchronization mode to be enabled. With automatic synchronization mode enabled, the controller, under certain operating conditions, will automatically synchronize the generator output 30 to the power bus 40. If automatic synchronization mode has been selected, program control passes to block 220. Otherwise, program control passes to block 350. Automatic synchronization mode may be selected by the operator in various ways. For example, there may be an automatic synchronization switch on the front of a control panel associated with controller 35. Or, in another embodiment, a programming tool may be connected with the controller 35 through which the operator sets a flag or memory location to indicate that automatic synchronization mode was requested. Other forms of known switches or programming may be included in the program of FIG. 2 to permit the operator to select an auto synchronization mode.

In block 220, program control determines whether there is a fault from dead bus sensor diagnostic controls that are included within the controller 35. If there is a fault, program control passes to block 350. Otherwise, program control passes to block 230. To determine whether a fault condition exits, the controller preferably inputs the magnitude of the voltage on connector 45 and also inputs the dead bus sensor signal on connector 65. The following table shows an implementation of a preferred embodiment of the dead bus sensor diagnostics:

| DIAGNOSTICS | | |
| --- | --- | --- |
| VOLTAGE ON LINE 45 | DEAD BUS SENSOR SIGNAL | DIAGNOSTIC STATDS |
| $>P_1$ | Open | Relay Okay |
| $>P_1$ | Closed | Fault |
| $<P_2$ | Open | Fault |
| $>P_2$ | Closed | Relay Okay | where:
$P_1$ = Programmable Upper Voltage Threshold
$P_2$ = Programmable Lower Voltage Threshold In block 230, the controller verifies conditions of other subsystems and operating parameters of the engine 15 and generator 20 among others. If those other conditions are satisfactory, then the controller permits program control to pass to block 240. Otherwise, control passes to block 350, exits the program, and automatic paralleling is not permitted.

In block 240, the controller verifies whether dead bus paralleling is enabled. Dead bus paralleling may be controlled by a switch on the front of a control panel associated with the controller 35, or may be a programmable flag or memory location in the controller 35. In the latter case, a service tool or other programming device is connected to the controller 35 by an operator and the operator programs the flag or memory location to permit dead bus paralleling. These and other methods employing a switch or other device can be used in connection with the present invention for causing the controller to enable dead bus paralleling. If, in block 240, dead bus paralleling is enabled, then program control passes to block 250. Otherwise, program control passes to block 350.

One important feature of an embodiment of the present invention is a customer programmable threshold value K to which the controller compares the measured voltage on connector 45. In a preferred embodiment, the threshold value K is programmable by the end user within certain limits. However, in other applications, the threshold value K could be a fixed value stored in memory. In block 250, if the measured voltage on connector 45 is greater than the customer programed threshold K or the dead bus sensor 50 indicates that the bus is live, then the controller determines that the bus is not dead and in order to connect the generator to the bus, the controller must synchronize the generator output 30 to the bus and program control passes to block 255. On the other hand, if the measured voltage is less than the customer programmed threshold K and the dead bus sensor 50 indicates that the bus is dead, then the controller 35 determines that there is a dead bus, control passes to block 260, and the controller issues a breaker signal on connector 70 causing the breaker 75 to close. In this case, program control then passes from block 260 to block 350.

As will be appreciated by those skilled in the art, use of the present invention allows the control to automatically connect a generator set to a dead bus. Furthermore, the invention reduces the risk of erroneously sensing that a bus is dead and improperly connecting the generator set to a live bus.

What is claimed is:

1. A generator set controller which is connected with a three-phase power bus, including:
   a controller having at least one analog input and at least one digital input and at least one output, the analog input being connected with a first phase of the three-phase bus;
   a dead bus sensor connected with the digital input, and a second and third phase of the bus and producing a live bus signal as a function of electrical characteristics of the second and third phase of the bus;
   a breaker connected with said output and having an open and a closed position, the position of the breaker being controlled by a breaker signal produced by the controller at said output, the generator being connected with the bus when the breaker is in the closed position;
   wherein the electronic controller issues a breaker signal causing the breaker to move to a closed position as said a function of signals received on said analog input and said digital input.

2. The generator set controller according to claim 1, wherein the dead bus sensor comprises a relay, said relay coil being connected between the second and third phases of the bus, and said relay contact being closed in response to a voltage potential between said second and third phases being greater than a predetermined level, and producing said live bus signal in response to the closing of the relay contact.

3. The generator set controller according to claim 1, wherein the live bus signal is produced by the dead bus sensor in response to the voltage difference between said second and third phase being greater than a predetermined value.

4. The generator set controller according to claim 1, wherein the electronic controller synchronizes the generator output to the three-phase bus and issues the breaker signal as a function of the voltage at the analog input being above a programmable value and receiving the live bus signal at said digital input.

5. The generator set controller according to claim 2, wherein the electronic controller synchronizes the generator output to the three-phase bus and issues the breaker signal as a function of the voltage at the analog input being above a programmable value and receiving the live bus signal at said digital input.

6. A method of controlling a generator connecting to a multi-phase power bus, said method including:
   sensing the magnitude of the voltage of a first phase of the power bus;
   determining whether a voltage difference between a second and third phase exceeds a predetermined level; and
   connecting said generator to said power bus in response to said steps of sensing and determining.

* * * * *